Nov. 19, 1940.  G. A. ZINK  2,222,525

METHOD OF MAKING BEARINGS

Filed July 8, 1937  2 Sheets—Sheet 1

Inventor
George A. Zink
By Blackmore, Spencer & Flint
Attorneys

Nov. 19, 1940.  G. A. ZINK  2,222,525
METHOD OF MAKING BEARINGS
Filed July 8, 1937  2 Sheets-Sheet 2

Inventor
George A. Zink
By Blackmore, Spencer & Flint
Attorneys

Patented Nov. 19, 1940

2,222,525

UNITED STATES PATENT OFFICE 2,222,525

METHOD OF MAKING BEARINGS

George A. Zink, Indianapolis, Ind., assignor to General Motors Corporation, Detroit, Mich., a corporation of Delaware Application July 8, 1937, Serial No. 152,472

4 Claims. (Cl. 22—204)

My invention relates to bearings especially designed for use in internal combustion and like engines which carry excessive loads and operate at extremely high speeds, and wherein the bearings are subjected to unusually high pressure per unit area of bearing surface; and they are particularly designed for use in airplane motors, wherein increasing horse-power and speed of operation results in that the bearings are subjected to many times the strain than has heretofore and comparatively recently been incident to the use of similar bearings in like service.

My invention relates particularly to bearings of the type wherein an extremely thin layer of bearing metal having good anti-frictional and wearing qualities, a layer much too thin to have any appreciable strength by itself and apart from a supporting element, is autogenously welded or fused to a supporting member of the complete bearing by an intermingling of the molecules of the two throughout the area of contact between the supporting part which does not contact with the journal with which the bearing is used, and the anti-friction bearing metal layer which runs in contact with the journal. The supporting part is preferably made of iron or steel to provide the requisite strength for the bearing as a whole; and the anti-friction bearing metal layer, while it may be made of various metals or alloys having good anti-friction and other qualities to be desired in bearings among which are bronzes of various compositions, is preferably made of silver. The thin layer of bearing metal may be inside the supporting member or cylindrical shell of the bearing so as to form a lining therefor, as in the more usual forms of crankshaft and connecting rod bearings; or such a bearing metal layer may be upon both the inner and outer surfaces of such a supporting shell as in so-called "floating" bearings, which are used in some V-type and radial engines wherein cylinders are arranged at an angle to one another, and two connecting rods act upon a single crankpin.

My invention consists in a method or process of making bearings of the type above described the anti-friction bearing metal layer being usually inside such a shell or support so as to form a lining therefor.

I have found as the result of extensive experimentation that silver forms an extremely good bearing metal layer in bearings of the type to which my invention relates. It has satisfactory anti-friction and wear resisting characteristics; it is of approximately the same hardness as high lead or "plastic" bronze and similar bronzes, which have to a great extent replaced "babbitt" lined bearings in engines wherein the bearings are subjected to severe service; it is among the best of heat conductors, so that heat due to friction between a bearing metal layer and the journal with which such layer runs in contact is rapidly conducted to the connecting rods or crankshaft housings whereby the bearings are supported; it is tough and less ductile than bearing metals heretofore used, and has little tendency to become distorted and to flow due to pounding to which bearings are subjected when in use; it has little or no tendency to seize upon the journals with which it runs in contact, so that scoring of such journals is avoided or reduced to a degree much less than in bearings heretofore in use; it may, in accordance with my improved method, be readily and more perfectly welded or fused to an iron or steel supporting member or shell than has heretofore been the case; and a bearing comprising a supporting member or shell having a bearing layer of silver welded or fused thereto has been found to operate longer with no sign of failure, and to withstand much greater pressure per unit of bearing area, than any bearing with which I am acquainted.

The drawings accompanying and forming a part of this specification illustrate how the method wherein my invention consists may be performed, as well also as a bearing made in accordance with my improved method.

Figure 1:
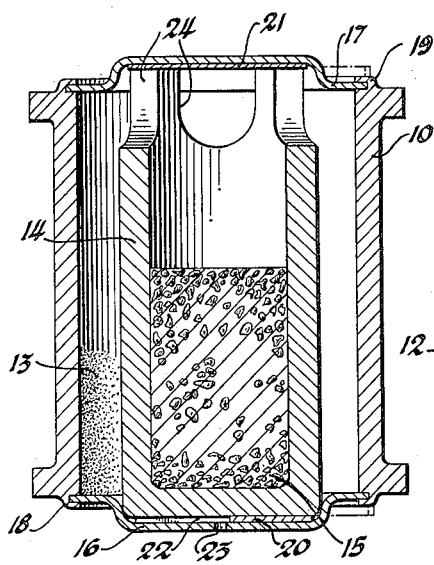
Figure 1 is a view showing a vertical central section of an assembly of parts used in making a lined bearing in accordance with my method.

Referring now to the drawings the numeral

Figure 2:
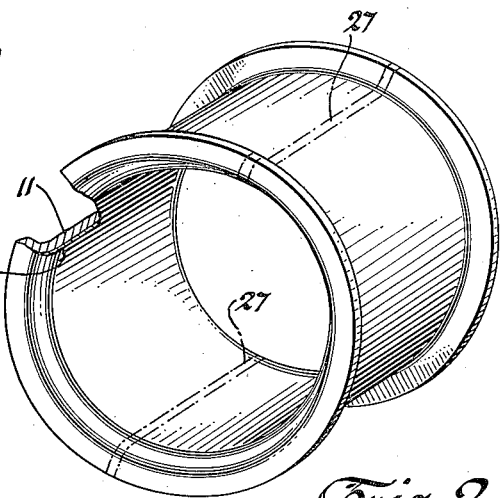
Figure 2 is a perspective view showing a bearing made in accordance with my invention.

10, Figure 1, designates an annular supporting member or shell, the same being made preferably from tubular iron or steel stock by suitable machining operations performed thereupon, and which as shown has flanges at its ends to provide a flanged bearing. This part provides a supporting member or back in the finished bearing and imparts the requisite strength thereto; the anti-friction bearing metal lining which is autogeneously welded to the interior of said shell being very thin, ordinarily around $\frac{1}{32}$ of an inch in thickness, and being of a much weaker metal has in itself little strength and contributes to a slight degree at most to the strength of the finished bearing. In Figure 2 the numeral 11 designates the back of a finished bearing formed by finishing the shell 10 to the proper dimension after a layer of bearing metal, preferably silver, has been welded to the inner surface thereof, and 12 designates such a bearing metal lining or layer which, as will be understood, contacts with the journal of the crankshaft with which the bearing cooperates; the bearing being assumed to be a main crankshaft or a crankpin bearing although bearings made in accordance with my invention may be used in any service wherein bearings are required.

After the shell member 10 has been formed as aforesaid the inner surface thereof is preferably electroplated with copper, as indicated by the shading at 13. Such a thin film secures a better bond between the bearing metal lining and the inner surface of the shell, and better welding of the lining and the shell; although it may be dispensed with and I have secured satisfactory welding of a bearing metal layer to a shell without the use of such a film, in which case the bearing metal layer is welded or fused to the shell without the use of any intervening metallic layer, like the copper film 13.

The numeral 14 designates a receptacle, or crucible because the metal 15 which forms the bearing layer 12 is melted in it; the same being made of a carboniferous material in substantially the same way that so-called "graphite" crucibles are made. This receptacle is held in a fixed position within the shell 10 and is spaced from the inner surface thereof, as shown; and the bearing layer forming metal, preferably silver, is placed within this receptacle in assembling the parts and exists therein in a solid unmelted condition before the assembly formed by the parts is heated as will hereinafter appear.

The ends of the shell 10 are closed by thin sheet metal heads 16, 17 which are shown as held to said ends by flanges 18, 19 which are bent inward and over the peripheries of the heads, although they may be welded to the ends of the shell as an alternative arrangement; said heads serving to prevent access of air to the interior of the assembly as will be understood. The central parts of the heads are recessed to thereby locate the receptacle 14 centrally within the shell 10, and asbestos washers 20, 21 are interposed between the ends of the receptacle and the heads as shown. The lower washer 20 has a radially extending slot 22, and the head 16 has a small hole 23 about $\frac{1}{16}$ of an inch in diameter, whereby the interior of the assembly is vented to the atmosphere during the heating step, as well as during the rotating step of my process. The upper end of the receptacle 14 is provided with recesses 24 so that after the assembly formed by the parts hereinbefore enumerated has been heated to a temperature high enough to melt the bearing layer forming metal, and the assembly removed and turned over and placed upon a device for rotating the same, see Figure 7, said molten metal, being preferably silver as stated, will run out from the receptacle and into the space between it and the interior of the shell 10, and be distributed over the interior of the shell by centrifugal action or force due to such rotation.

The assembly shown in Figure 1 and made up of the parts assembled as aforesaid is next heated in any suitable gas-fired or other furnace to a temperature sufficiently high to melt the bearing layer forming metal and somewhat in excess of that temperature to insure free flowing of the metal. This temperature in the case of silver should be around 1900 degrees F., and will be sufficiently high to secure free and complete flowing of the layer forming metal over the inner surface of the shell during the rotating step of my process. During the heating step the shell itself will obviously attain a temperature considerably above that necessary to accomplish the melting of the silver as will be understood. In making bearings around 2½ inches in diameter and 3 inches in length the heating step may ordinarily be accomplished in around forty minutes, varying of course with the rate at which gas is supplied to and burned within the furnace.

Figure 7:
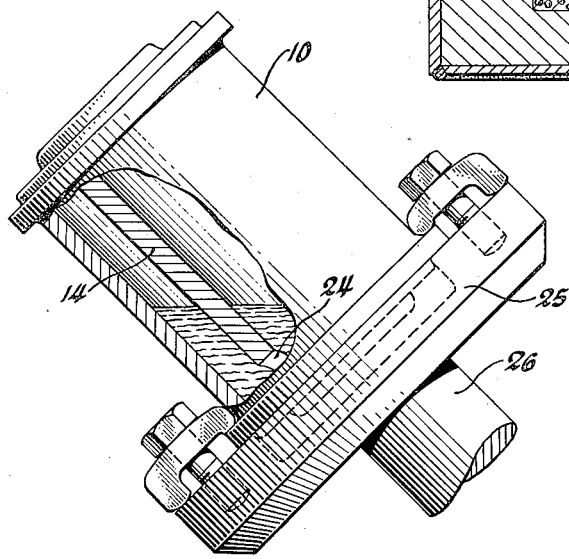
Figure 7 is a view showing a conventional assembly rotating device used in making bearings in accordance with my invention.

The bearing forming assembly is next removed from the furnace and turned over and transferred as quickly as possible to a rotating device such as is indicated conventionally in Figure 7 wherein 25 is a rotating head to which the assembly is fastened by any suitable holding mechanism, and 26 is a shaft whereby said head is rotated at around 1750 R. P. M. in making bearings of the size above mentioned. The molten silver runs through the recesses 24 into the interior of the shell 10 and is distributed over the inner surface thereof by centrifugal force; the assembly is rotated in the atmosphere until the silver solidifies and the assembly becomes cool enough to handle; the quantity of silver melted in the receptacle 14 is sufficient to form an initial layer about $\frac{1}{16}$ of an inch in thickness upon the inside of the shell 10; and during the rotating step the interior of the shell is vented to the atmosphere through the radial slot 22 and hole 23 to prevent the formation of a vacuum inside the shell as the assembly cools.

The heads are next removed and the bearing finished to the requisite dimensions by suitable machining operations. Obviously the receptacle 14 may be removed from the shell after one head has been removed and it may be used again in a subsequent bearing making procedure; in fact I have used a single crucible or receptacle as many as fifty times in making bearings in accordance with my method.

The lining of silver or equivalent bearing metal will be thicker in the rough unfinished than in the finished bearing, but not excessively thicker; and such metal as is removed may be remelted and used in making subsequent bearings, unused or virgin metal being added as may be necessary. Figure 2 shows a finished cylindrical bearing which may be used as shown in various places; while the dotted lines at 27 indicate how such a cylindrical bearing may be slitted to form two semi-cylindrical or half bearings such as are commonly used for crankshaft bearings. In this last case and if a lubricant is supplied to the bearings under high pressure the half bearings will ordinarily be operated upon by the usual coining press to give them truly semi-cylindrical shapes, so that when two are used together they will form an unbroken cylinder with no gaps where material was removed in slitting the initial cylinder to provide semi-cylindrical or half bearings.

My understanding as to what occurs in performing the method wherein my invention consists, and during the steps specified which collective constitute the same, is as follows, although it is not asserted that the method may not be otherwise explained nor that the ultimate chemical reactions referred to may not differ from those enumerated:

The bearing assembly or mold will be full of air containing a minute percentage of water vapor when it is placed in the heating furnace and during the heating step air, to the extent that its volume is increased by heating, will escape through the vent passage 22, 23 to the atmosphere. The attenuated air remaining inside the mold assembly will be substantially free from water vapor before the assembly has reached a temperature approaching that at which the silver or equivalent bearing layer forming metal melts.

As the temperature approaches that at which the bearing layer forming metal melts carbon derived from the carboniferous receptacle 14 combines with such oxygen of the air as remains inside the assembly to form carbon monoxide (CO) which, because of the small amount of oxygen present and the abundance of carbon, will not be oxidized to the carbon dioxide ($CO_2$) stage; the result being that the assembly will be filled with carbon monoxide as the temperature thereof approaches that at which the silver melts.

Carbon monoxide being an extremely effective reducing agent such small quantities of oxides of the bearing forming metal and of the shell or casing as may be present are reduced to their metals during the heating steps of the method, with concomitant production of carbon dioxide ($CO_2$) as an end product of the reducing action. The carbon dioxide present will, at the high temperature existent toward the end of the heating step, be itself decomposed into carbon monoxide and oxygen; and the resulting oxygen will combine with more carbon derived from the receptacle to produce more carbon monoxide and effect further reduction of oxides, if they have not all been reduced; the supply of carbon monoxide inside the bearing assembly being thus replenished and augmented during and until the end of the heating step thus insuring that all the metallic oxides present will be reduced prior to the rotating step of my method.

The reducing process leaves the bearing layer forming metal and the inner surface of the shell 10 (as well also as of the heads) chemically clean and free from metallic oxides, so that conditions are perfect for the fusing and bonding of the bearing metal to the interior of the shell as it is distributed thereover during the rotating step; whereby an autogenous bond is formed between said bearing metal and the shell and the two form in effect a single integral structure the parts of which are inseparable from one another in the finished bearing. It will be appreciated that the highly heated carbon monoxide gas comes into free contact with the inner surface of the shell and the bearing layer forming metal during the entire heating step, and until the instant molten metal contacts with said surface during the rotating step of my method.

Figure 3:
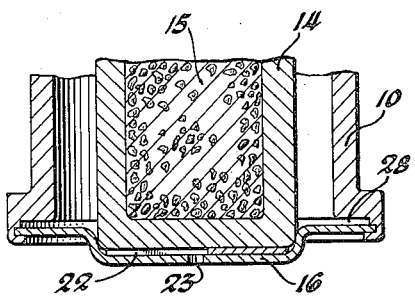
Figure 3 is a fragmentary view similar to Figure 1 but showing a feature made use of in making a bearing wherein the flange has a bearing metal layer.

Figure 3 shows an assembly which differs from that of Figure 1 in that the shell 10 is recessed at its ends, as at 28, so that some bearing layer forming metal will flow radially and provide a finished bearing in which the flanges have layers of bearing metal upon them, which is of importance where the bearing has to resist end thrust. In the bearing shown in Figure 2, made by the assembly shown in Figure 1, the end flanges have no layers of bearing metal upon them.

Figure 4:
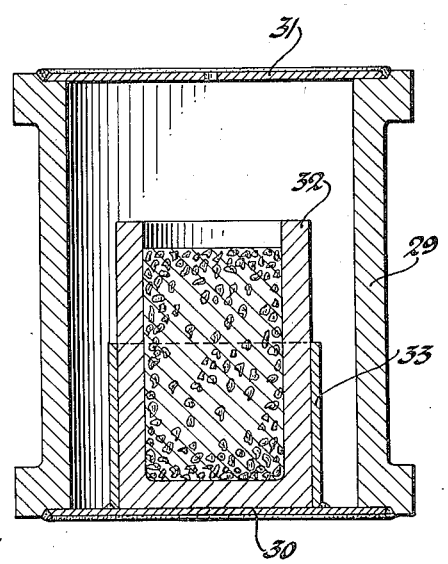
Figure 4 is a view similar to Figure 1 but showing a different but equivalent bearing making assembly.

Figure 4 shows a bearing forming assembly which I have also used successfully. In this form the shell 29 and the heads 30, 31 are the equivalents of the shell and heads of Figures 1 and 3, but the carboniferous receptacle 32 for the bearing layer forming metal is held within a cup 33 welded to the lower head 30. In this form the operation is the same as hereinbefore explained except that the assembly does not have to be turned over when it is placed upon the rotating mechanism, centrifugal force being relied upon to cause the bearing forming metal to leave the receptacle and distribute itself over the inner surface of the shell.

Figure 5:
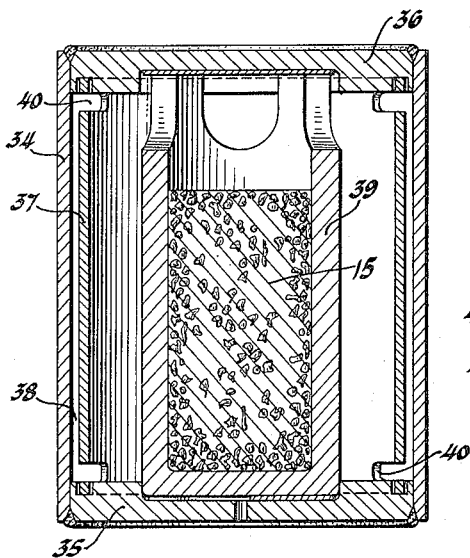
Figure 5 is a view showing a section upon a vertical central plane of an assembly adapted to form a floating bearing, wherein a supporting shell has a bearing metal layer upon both its inner and outer surfaces.
Figure 6:
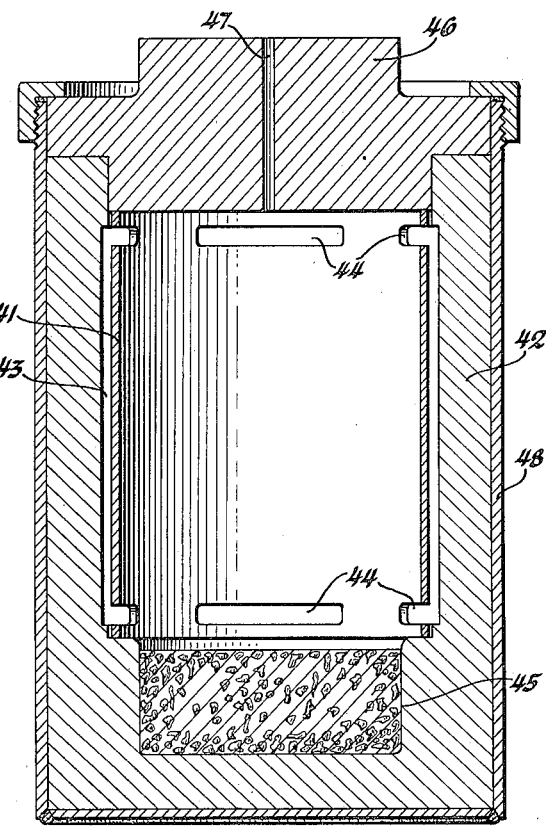
Figure 6 is a view similar to Figure 5 but showing a different assembly for making a floating bearing similar to the one contemplated in Figure 5.

Figures 5 and 6 illustrate assemblies used in making floating bearings in accordance with my invention, such bearings having a bearing metal layer welded or fused to both surfaces of a supporting shell made of iron or steel or equivalent metal. Thus in Figure 5 the numeral 34 designates an outer metallic casing the ends of which are closed by heads 35, 36 welded to the ends thereof, and 37 is a supporting shell for the bearing to be produced the upper and lower ends of which enter annular grooves provided in the inner surfaces of the heads; said shell being of less diameter than the internal diameter of the casing 34, whereby an annular space 38 is provided into which molten bearing layer forming metal may enter to provide a bearing metal layer upon and fused or welded to the outside of said shell.

The receptacle 39 is made of carboniferous material the same as the receptacle 14, and is held in place within the shell 37 between the heads in substantially the same way as in Figures 1 and 3.

The assembly shown in this figure is heated to melt the bearing layer forming metal within the receptacle 39 the same as hereinbefore explained, and the same is rotated after said metal has been melted by the same or by rotating mechanism the equivalent of that shown in Figure 7.

Rotation of the assembly shown in Figure 5 distributes molten bearing layer forming metal over the inner surface of the shell 37; and a part thereof flows through holes 40 at the ends of the shell and fills the space 38, thus providing layers of bearing metal upon both the inner and outer surfaces of the shell 37.

After the assembly has become cool the heads 35, 36 and the casing 34 are removed by suitable machinery operations, thus exposing a layer of bearing metal, preferably silver, upon the outside of the shell; and the layer of bearing metal inside the shell is finished to the requisite dimensions, thus providing a floating bearing comprising a central supporting shell of steel or equivalent material having bearing layers of silver upon both its inner and outer surfaces. The ends of the shell 37 beyond the holes 40 is also removed as they serve only to hold the shell in proper position to provide the space 38 for the outer layer of bearing metal.

It is obvious that the assembly illustrated in Figure 5 may be used to provide a layer of bearing metal upon the outside only of a supporting shell like the shell 37, this being best accomplished by supplying the receptacle 39 with but slightly more silver than is necessary to fill the space 38; the outer layer being finished as hereinbefore explained, and such slight film as may be upon the inner surface of the shell being removed by suitable boring or reaming operations.

In the bearing forming assembly shown in Figure 6 the supporting member or shell 41 is held in place within a cylinder 42 of carboniferous material in such a way as to provide an annular space 43 into which molten silver or equivalent bearing layer forming metal runs through holes 44, to provide a layer of bearing metal upon the outside of the shell; there being a cavity 45 in the lower end of the cylinder within which the silver is placed before closing the assembly by a carboniferous head 46 having a vent passage 47, and within which cavity the silver is melted by heating the assembly as in the forms of assembly hereinbefore described. The cylinder 42 and head 46 are commonly enclosed within an outer metallic casing 48 as shown.

In this form the assembly after having been heated, is rotated by suitable rotating mechanism as in the other forms of assembly described, and the molten silver is distributed over the inner surface of the shell 41 and runs through the holes 44 to provide an outer layer upon said shell; and the rough bearing is finished the same as hereinbefore explained. In this assembly the carboniferous cylinder when of the particular form shown cannot be used again, as the bearing cannot be removed without destroying the same; but on the other hand the cylinder may be made from a cheaper material having less graphite in its composition than the carboniferous receptacles of the other form of assembly described, and the use of metallic heads and of welding operations is dispensed with so that the cost of making bearings by the use of the assembly illustrated in Figure 6 is not greatly, if at all, increased.

Having thus described and explained my invention I claim and desire to secure by Letters Patent:

1. The steps in a method of making a bearing having a layer of bearing metal fused or welded to a supporting shell which consist in assembling a supporting shell and a receptacle made of carboniferous material and containing a metal for forming a bearing metal layer upon said shell, said bearing layer forming metal being out of contact with said shell; restricting access of air to said bearing layer forming metal and to the surface of said shell to which a layer of bearing metal is to be applied; heating the assembly thus formed to a temperature sufficient to melt said bearing layer forming metal and to produce a reducing gas within said shell; and rotating said assembly while it is in the heated condition aforesaid in the atmosphere, and until it becomes cool, to thereby distribute said bearing layer forming metal over the surface of said shell to be provided with a layer of bearing metal.

2. The steps in a method of making a bearing having a layer of bearing metal fused or welded to a supporting shell which consist in providing a supporting shell; assembling a receptacle made of carboniferous material within and spaced apart from said shell, and which receptacle is held in a fixed position and contains a metal for forming a bearing metal layer upon said shell; restricting access of air to said bearing layer forming metal and to the surface of said shell to which a layer of bearing metal is to be applied; heating the assembly thus formed to a temperature high enough to melt said bearing layer forming metal and to produce a reducing gas within said shell; and rotating said assembly while it is in the heated condition aforesaid in the atmosphere, and until it becomes cool, to thereby distribute said bearing layer forming metal over the surface of said shell to be provided with a layer of bearing metal.

3. The steps in a method of making a bearing having a lining layer of bearing metal welded or fused to a supporting shell which consist in providing a supporting shell; assembling a receptacle made of carboniferous material within and spaced from the inner surface of said shell, and which receptacle is held in a fixed position and contains a metal for forming a bearing metal lining within said shell; closing the ends of said shell by suitable heads whereby access of air to the interior thereof is restricted; heating the assembly thus formed to a temperature high enough to melt said bearing layer forming metal and to produce a reducing gas within said shell; and rotating said assembly while it is in the heated condition aforesaid in the atmosphere, and until it becomes cool, to thereby distribute said bearing layer forming metal over the inner surface of said shell.

4. The steps in a method of making a bearing having a lining layer of silver welded or fused to a supporting shell which consist in providing an iron or steel shell; assembling a receptacle made of carboniferous material within and spaced from the inner surface of said shell, and which receptacle is held in a fixed position and contains silver to provide a bearing metal lining within said shell; securing heads to the ends of said shell whereby access of air to the interior thereof is restricted; heating the assembly thus formed to a temperature sufficient to melt the silver which provides said lining and to produce a reducing gas within said shell; and rotating said assembly while it is in the heated condition aforesaid in the atmosphere, and until it becomes cool, to thereby distribute said silver lining metal over the inner surface of said shell.

GEORGE A. ZINK.